L. OBRECHT.
SPRING SUSPENSION ATTACHMENT FOR MOTOR VEHICLES.
APPLICATION FILED SEPT. 27, 1920.
1,389,318.
Patented Aug. 30, 1921.
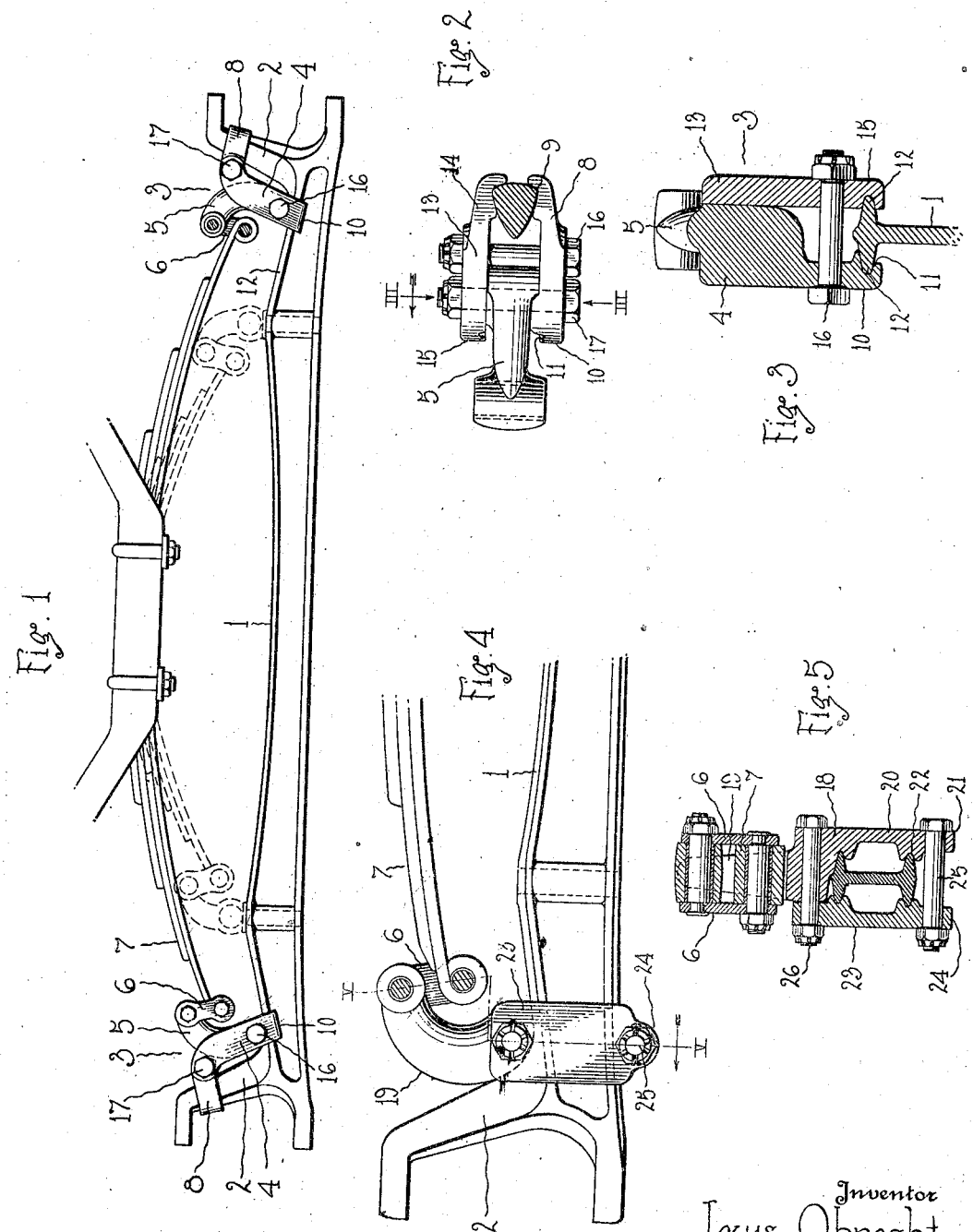
Inventor
Louis Obrecht
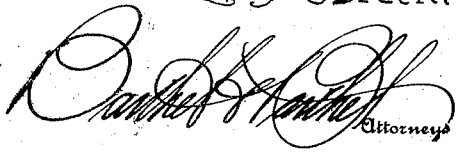
Attorneys

UNITED STATES PATENT OFFICE.

LOUIS OBRECHT, OF MOUNT CLEMENS, MICHIGAN.

SPRING-SUSPENSION ATTACHMENT FOR MOTOR-VEHICLES.

1,389,318.            Specification of Letters Patent.      Patented Aug. 30, 1921.

Application filed September 27, 1920. Serial No. 413,135.

*To all whom it may concern:*

Be it known that I, LOUIS OBRECHT, a citizen of the United States of America, residing at Mount Clemens, in the county of Macomb and State of Michigan, have invented certain new and useful Improvements in Spring-Suspension Attachments for Motor-Vehicles, of which the following is a specification, reference being had therein to the accompanying drawings.

The axle and spring suspension construction of certain motor vehicles wherein a single semi-elliptic spring is employed extending longitudinally of the axle, is such that only a comparatively short spring may be used and the attachment of the ends of the spring to the axle is made at points considerably removed from the ends of the axle, thus increasing the strains on the axle and wheels by the application of the load at points remote from the wheel bearings or from the knuckles of the front axle.

This invention relates to an attachment adapted to be substituted for the usual spring suspension and more particularly the front spring suspension of a Ford motor vehicle. An object of the invention is to provide an attachment which may be expeditiously substituted for the well known suspension without the necessity for making holes or otherwise changing the standard parts to which the attachment is to be applied. A further object is to provide an attachment which is such that when in place upon the axle of the vehicle, said axle will be braced and strengthened thereby and the axle by reason of the manner of applying the attachment thereto will brace and support the spring hangers or perches of the attachment against load strains.

With the above and other ends in view, the invention consists in the matters hereinafter set forth and more particularly pointed out in the appended claims, reference being had to the accompanying drawing in which—

Figure 1 is a front elevation of a front axle and portion of the front end of a frame of a motor vehicle with an attachment illustrative of the invention applied thereto;

Fig. 2 is a detail of a hanger or perch showing the same in plan view and illustrating the manner of its attachment to an axle and its yoke arm;

Fig. 3 is a vertical section of the same substantially upon the line III—III of Fig. 2;

Fig. 4 is a front elevation of an end portion of an axle illustrating a slightly modified form of spring hanger or perch applied thereto; and Fig. 5 is a transverse vertical section of the same substantially upon the line V—V of Fig. 4.

As shown in the drawing, 1 indicates an axle and more particularly the front axle of a Ford motor vehicle, said axle being formed with the usual yokes at its ends to receive the usual knuckles (not shown) for pivotally attaching the usual stub axles (not shown) upon which the front wheels of the vehicle are mounted. The upper arm 2 of each of these yokes extends upwardly from the end and top edge of the axle and seated within the angles formed by the meeting of said arms 2 and axle are spring hangers or perches indicated as a whole by the numeral 3. The body 4 of each hanger or perch is formed with an upwardly extending and inwardly curved arm or goose-neck 5 having an eye or opening at its upper end for the attachment thereto of the usual links 6 which are in a like manner attached at their lower ends to an eye formed in the end of a semi-elliptic spring 7, the overall length of which spring is considerably greater than that of the usual spring indicated in dotted lines in Fig. 1, because of the location of the spring perches of this attachment adjacent the ends of the axle instead of at a considerable distance therefrom, as in the usual Ford construction.

The body 4 of each perch is also formed with an upwardly and outwardly extending integral arm 8 adapted to engage one side of the adjacent yoke arm 2, the inner side or face of said arm 8 being grooved or fashioned to fit closely against the outer side of said yoke arm, as shown at 9 in Fig. 2. The lower end portion of said body 4 is formed with a downwardly extending lug 10 at one side which is grooved upon its inner face or fashioned to engage one side of the axle 1 adjacent its yoke arm, the formed side 11 of said lug being adapted to receive or interlock with a rib or side flange 12 of the Ford axle shown in Fig. 3 where the attachment is applied to an axle having such form.

Engaging the side of the body 4 opposite that having the arms 8 and lug 10, is a plate or clamping member 13, which is also formed with an upwardly and outwardly extending arm 14 similar to the arm 8 and a downwardly extending lug or end portion 15 similar to the lug 10, and this arm 14 and lug 15 are each grooved or fashioned in a manner similar to arm and lug on the body 4 to engage, receive or interlock with the side of the arm 2 and with the side of the axle or rib or flange 12 thereon, opposite that engaged by the arm and lug on the body. The plate 13 and body 4 are drawn toward each other to firmly clamp the axle and its yoke arm therebetween, by means of bolts 16 and 17 passing through openings in said body and plate above the axle and adjacent its yoke arm. The hangers or perches 3 are thus securely held in place upon the axle without the necessity for boring holes or otherwise changing the original construction of the axle and the yoke arms 2 of the axle serve to support the perches against the outward thrust of the load which would otherwise tend to work them loose and bend or break them. By reason of the support which is afforded by these yoke arms 2, very rigid and strong attachable perches are provided which may be readily clamped in place. Further, the attachment of these perches to the axle adjacent its ends, provides for a semi-elliptic spring of maximum length and the load is applied at the ends of the axle adjacent the wheels, thus relieving the axle, its knuckles and the wheels and their bearings of the severe strains to which they are subjected when the load is carried by the axle in the usual manner.

In the modified construction shown in Figs. 4 and 5 the spring perch comprises a body 18 (see Fig. 5) which is formed to seat upon the axle within the angle formed by the junction of the upwardly extending yoke arm 2 therewith, and the upper end of this body is formed with an integral goose neck 19 to which the spring shackle or links 6 are connected in the usual manner. The body 18 is also formed with a portion 20 extending downwardly at one side of the axle with its lower end projecting below the lower side of the axle and formed with an eye 21. The inner face of the plate portion 20 is grooved or fashioned to engage one face or side of the axle, said face, where the axle is of I-beam construction in cross-section, being provided with grooves 22 to receive the flanges of the axle. A clamping plate 23 is provided to engage the opposite side of the axle, its inner face being also grooved or fashioned to engage the axle or flanges thereof, and the lower end of this plate has an eye 24 opposite the eye 21 to receive a clamping bolt 25. The body 18 and plate 23 are also formed with openings to receive a clamping bolt 26 extending therethrough above the axle. The spring perch of the attachment may therefore be firmly clamped to the axle without the necessity for boring holes or otherwise changing the original form of the axle, and the upwardly extending yoke arm of the axle forms a seat and support for such perch.

Obviously this form of attachment may be applied to axles of other forms than that illustrated and which are provided with members adjacent their ends forming seats or supports for these perches, the shape of which may also be varied to fit the particular form of axle to which they are to be attached. Other changes may also be made in the construction of the attachment within the scope of the appended claims without departing from the spirit of the invention and I do not, therefore, wish to confine myself to the particular form or arrangement shown.

Having thus fully described my invention, what I claim is:

1. A spring attachment for motor vehicles having an axle formed with a laterally extending yoke arm adjacent each end thereof, said attachment including spring perches and a semi-elliptic spring connected at its ends to said perches each perch comprising a member formed to seat within the meeting angles of said axle and its yoke arms and to engage one side of the adjacent arms and axle, a clamping member to engage the other side of the yoke arm and axle, and means for securing the clamping member to said seated member to clamp said arm and axle therebetween.

2. As a new article of manufacture, a spring perch including a curved arm having an eye at its free end for the attachment thereto of a spring hanger, said arm being adapted to extend within the angle formed by an axle and its yoke arm, and means for detachably securing said spring perch to an axle adjacent its yoke arm and to said arm at a distance from the point of union of said arm and axle, whereby the spring perch is supported by the yoke arm against longitudinal movement and the meeting angle of the yoke arm and axle is strengthened.

3. An attachment for the front axle of a motor vehicle wherein such axle is formed with a yoke arm integral with and extending laterally from the axle body, and said body is formed at a distance inwardly from said arm with a seat for the spring perch, said attachment comprising a spring perch formed with a forwardly extending rigid arm curved in a direction longitudinally of the axle body and provided with an eye at its free end for the attachment of a spring thereto, said spring perch being also formed with a portion to engage over the axle body and seat within the meeting angle of said arm and body, and formed to engage one side of the axle body adjacent said angle and interlocked therewith, and a clamping member to engage and interlock with the opposite side of the axle body, said portion and clamping member being formed with openings to receive bolts for detachably securing the parts together with the axle body clamped therebetween.

In testimony whereof I affix my signature in presence of two witnesses.

LOUIS OBRECHT.

Witnesses:
ANNA M. DORR,
CHAS. W. STAUFFIGER.